United States Patent
Kim et al.

(10) Patent No.: US 8,103,002 B2
(45) Date of Patent: Jan. 24, 2012

(54) PULSE POSITION BASED-CHAOTIC MODULATION (PPB-CM) COMMUNICATION SYSTEM AND METHOD

(75) Inventors: Jae-hyon Kim, Suwon-si (KR);
Young-hwan Kim, Hwaseong-gun (KR);
Hyunkuk Kim, Daejeon (KR);
Hyuncheol Park, Daejeon (KR);
Seong-soo Lee, Suwon-si (KR);
Jaeseung Son, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1421 days.

(21) Appl. No.: 11/489,458

(22) Filed: Jul. 20, 2006

(65) Prior Publication Data

US 2007/0133801 A1 Jun. 14, 2007

(30) Foreign Application Priority Data

Dec. 8, 2005 (KR) .................. 10-2005-0119382

(51) Int. Cl.
*H04L 9/00* (2006.01)
(52) U.S. Cl. ......... 380/263; 375/219; 375/260; 375/295
(58) Field of Classification Search .......... 375/219, 375/260, 295; 380/263
See application file for complete search history.

(56) References Cited

U.S. PATENT DOCUMENTS

2005/0249271 A1* 11/2005 Lau et al. ............... 375/219
2008/0247442 A1* 10/2008 Orlik et al. ............... 375/138

FOREIGN PATENT DOCUMENTS

KR 2000-0056210 A 9/2000

OTHER PUBLICATIONS

Yong et al. "UWB-DCSK Communication Systems for Low Rate WPAN Applications", Personal, Indoor and Mobile Radio Communications, 2005. PIMRC 2005. IEEE 16th International Symposium on Berlin, Germany Sep. 11-14, 2005, Piscataway, NJ, USA, IEEE, pp. 911-915.*

Jako et al. "Design of Large Signal Set for DCSK Modulations", 6th IEEE Conference on Telecommunications (Conf. Publ. No. 451) Publication Year: Mar. 1998 , pp. 44-48.*

* cited by examiner

*Primary Examiner* — Curtis Odom
(74) *Attorney, Agent, or Firm* — Sughrue Mion, PLLC

(57) ABSTRACT

A PPB-CM communication system and method. The PPB-CM communication system includes a transmitter which splits a symbol period, which is a transmission unit of a communication signal, into at least a pair of parts, inserts a data signal into one of the parts, and transmits a communication signal having the data signal inserted; and a receiver which receives the communication signal from the transmitter and determines bit information of the symbol period according to which part of the symbol period has the data signal inserted, as determined by comparison of energy levels of the parts. Accordingly, a separate threshold is not required to determine the data bit of the symbol period. Thus, the communication signal can be accurately determined. Also, the communication system can be simply implemented without need of a delay line.

26 Claims, 6 Drawing Sheets

PULSE POSITION BASED-CHAOTIC MODULATION (PPB-CM) COMMUNICATION SYSTEM AND METHOD

CROSS-REFERENCE TO RELATED APPLICATIONS

This application claims the benefit under 35 U.S.C. §119 (a) from Korean Patent Application No. 2005-119382 filed on Dec. 8, 2005 in the Korean Intellectual Property Office, the entire disclosure of which is incorporated herein by reference.

BACKGROUND OF THE INVENTION

1. Field of the Invention

The present invention generally relates to a pulse position based-chaotic modulation (PPB-CM) communication system and method. More particularly, the present invention relates to a PPB-CM communication system and method for determining the data bits of a communication signal more accurately, with a simple implementation.

2. Description of the Related Art

The IEEE 802.15.4a task group is the location-aware low-power sensor network standardization group. Location-aware low-power sensor networking is a next generation communication technique in which the location awareness capability and low power requirements are added to the combination of IEEE 802.15.4 ZigBee and IEEE 802.15.3 ultra wide band (UWB) communication techniques.

A chaotic signal modulation method is suggested for the realization of the low power requirement. Chaotic signal modulation can be designed in a simple radio frequency (RF) structure by hardware, and does not require circuitry such as a voltage controlled oscillator (VCO), phase locked loop (PLL), mixer and the like that have been requisite for existing RF products. Thus, chaotic signal modulation can reduce the power consumption to 5 mW, which is one third of that previously considered necessary.

Representative modulation schemes of the chaotic signal modulation are the differential chaos shift keying (DCSK) scheme and the chaotic on-off keying (COOK) scheme.

FIG. 1 is a block diagram of the DCSK communication system. As shown in FIG. 1, the DCSK communication system includes a transmitter 10 and a receiver 20.

The transmitter 10 includes a chaotic signal generator 11, a multiplier 13, a delay 15, and a switch 17. The transmitter 10 loads data on a chaotic signal and transmits the chaotic signal to the receiver 20.

The chaotic signal generator 11 generates a chaotic signal having certain characteristics to carry data.

The multiplier 13 receives a data bit 0 or 1, which is to generate the data, multiplies the chaotic signal generated at the chaotic signal generator 11 by the data bit, and feeds the product to the delay 15. When the data bit is 0, the chaotic signal is reversed, and when the data bit is 1, the chaotic signal is retained.

The delay 15 generates the data signal contained in the second half of the symbol duration by delaying the signal generated at the multiplier 13 by half of the symbol period.

The switch 17 includes a first contact to the chaotic signal generator 11 and a second contact to the delay 15. The switch 17 switches to output one of the signal from the chaotic signal generator 11 and the signal from the delayer 15. Under control of a controller (not shown), the switch 17 switches between the first contact and the second contact each ½ of the symbol period Ts. For instance, when the switch 17 connects to the first contact for ½ Ts, the reference signal is output from the chaotic signal generator 11. When the switch 17 connects to the second contact for ½ Ts, the data signal from the delayer 15 passes through the switch 17 and is output.

The receiver 20 includes a delay 25, a multiplier 23, a waveform generator 27, and a data determiner (not separately shown).

The delay 25 delays the communication signal received via an antenna, by as much as the delay 15 of the transmitter 10 has delayed, that is, by ½ Ts. This is to allow for determining digital data by comparing the reference signal and the data signal.

The multiplier 21 adds the signal delayed at the delay 25 and the communication signal received via the antenna, and provides the added signal to the waveform generator 27. At this time, when the reference signal and the data signal are the same, that is, the data bit is 1, the communication signal with double energy is output. When the data bit is 0, the communication signal with double negative energy is output since the reference signal and the data signal are contrary to each other.

The waveform generator 27 takes the chaotic signal apart and generates a waveform by adding the communication signal output from the multiplier 23 over a certain interval, for example, the symbol period.

The data determiner receives the waveform from the waveform generator 27 and extracts digital data from it. The data determiner determines the digital data according to whether the waveform is over or under a predefined threshold. When the waveform is over the threshold 0, the data determiner determines the digital data as a 1. When the waveform is under the threshold, digital data of 0 is determined.

However, the DCSK communication system needs a lengthy delay line (20 m) to delay the reference signal by ½ Ts when generating the data signal. Hence, the DCSK communication system is not suitable for the IEEE 802.15.4a environment which aims to provide a sensor network.

To overcome this shortcoming, the COOK modulation technique which does not include a delay line is suggested.

FIG. 2 is a block diagram of a COOK communication system.

A transmitter 60 according to the COOK modulation scheme includes a chaotic signal generator 61 for generating a chaotic signal, and a multiplier 63 for multiplying the chaotic signal by the data bit 0 or 1 to generate data. A communication signal output from the transmitter 60 does not carry the chaotic signal in the symbol period having the data bit 0, but carries the chaotic signal in the symbol period having the data bit 1.

A receiver 70 includes a squarer 71, an adder 73, and a data determiner 75.

The squarer 71 squares and outputs the received communication signal. The adder 73 calculates an energy value of the communication signals by summing up all the communication signals within the symbol period.

The data determiner 75 determines whether the data bit contained in the symbol period is 0 or 1 using a threshold. Particularly, the data determiner 75 determines the data bit 1 for the symbol period having the energy value greater than the threshold, and the data bit 0 for the symbol period having the energy value smaller than the threshold. At this time, the data determiner 75 needs to set the threshold. Yet, it is hard for the receiver 70 to predefine the threshold because it does not know the magnitude of the communication signal received from the transmitter 60. In more detail, the receiver 70 has difficulty in acquiring an optimal threshold that is defined to be half of the summation of the signal energies when 1 is received from the transmitter 60 and the signal energies when 0 is received from the transmitter 60. As a result, the accuracy is degraded in relation with the data bit determination.

To resolve the shortcoming of the COOK modulation, a method is suggested to insert a guard interval having no signal between adjacent symbol periods and to set the threshold to a multiple of the real number of the noise energy acquired in the guard interval.

However, it is hard to measure merely the pure noise because the channel power affects the guard interval as the communication signal passes through the channel in the channel environment. Thus, a simulation of the method using the noise energy of the guard interval shows a performance degradation when the noise energy is greater than a specific number, and the error flow when the noise energy is smaller than the specific number.

Therefore, there is a demand for a new communication system capable of accurately determining the data bit of the communication signal, without using a delay line.

SUMMARY OF THE INVENTION

The present invention has been provided to address the above-mentioned and other problems and disadvantages occurring in the conventional arrangement, and an aspect of the present invention is to provide a PPB-CM communication system and method for accurately and easily determining a communication signal with a simple implementation.

According to an aspect of the present invention, a PPB-CM communication system includes a transmitter which splits a symbol period, which is a transmission unit of a communication signal, into at least a pair of parts, inserts a data signal in one of the parts, and transmits a communication signal having the data signal inserted; and a receiver which receives the communication signal from the transmitter and determines bit information of the symbol period according to which part of the symbol period has the data signal inserted.

The transmitter may include a chaotic signal generator which generates a chaotic signal which is used as the data signal; and a signal position modulator which splits the symbol period into the parts, and inserts the chaotic signal generated at the chaotic signal generator into one of the parts according to the bit information.

The signal position modulator may split the symbol period into a first half and a second half, that is, a pair of parts.

The signal position modulator may insert the chaotic signal in the second half when the bit information is 1, and insert the chaotic signal in the first half when the bit information is 0.

The signal position modulator may insert the chaotic signal in the first half when the bit information is 1, and insert the chaotic signal in the second half when the bit information is 0.

The receiver may include a signal processor which calculates an energy value by summing up the data signals in the symbol period; and a data determiner which determines the bit information using the energy value calculated at the signal processor.

The signal processor may calculate the energy value for the respective parts in the symbol period.

The data determiner may determine the bit information by comparing the energy values of the parts.

The signal processor may calculate the energy value of the first half and the second half of the symbol period, respectively, and the data determiner may determine the bit information according to which one of the energy values of the first half and the second half is greater.

When the signal position modulator inserts the chaotic signal in the first half of the symbol period when the bit information is 0 and inserts the chaotic signal in the second half when the bit information is 1, the data determiner may determine the bit information as 0 when the energy value of the first half is greater than the energy value of the second half and determine the bit information as 1 when the energy value of the second half is greater than the energy value of the first half.

When the signal position modulator inserts the chaotic signal in the second half of the symbol period when the bit information is 0 and inserts the chaotic signal in the first half when the bit information is 1, the data determiner may determine the bit information as 1 when the energy value of the first half is greater than the energy value of the second half and determine the bit information as 0 when the energy value of the second half is greater than the energy value of the first half.

According to another aspect of the present invention, a PPB-CM communication system includes a transmitter having a chaotic signal generator which generates a chaotic signal, and a signal position modulator which splits a symbol period into a plurality of parts and inserts the chaotic signal generated at the chaotic signal generator into one of the plurality of parts.

The PPB-CM communication system may further include a receiver having a signal processor which calculates an energy value by summing up signals in the symbol period, and a data determiner for determining bit information of the symbol period by use of the energy value calculated at the signal processor.

According to another aspect of the present invention, a PPB-CM communication method includes generating a data signal; splitting a symbol period, which is a transmission unit of a communication signal, into at least a pair of parts; and inserting the data signal in one of the parts and transmitting the communication signal having the data signal inserted.

BRIEF DESCRIPTION OF THE DRAWING FIGURES

These and/or other aspects and advantages of the present general inventive concept will become apparent and more readily appreciated from the following description of the embodiments, taken in conjunction with the accompanying drawings of which:

DETAILED DESCRIPTION OF THE EXEMPLARY EMBODIMENTS

Figure 1:
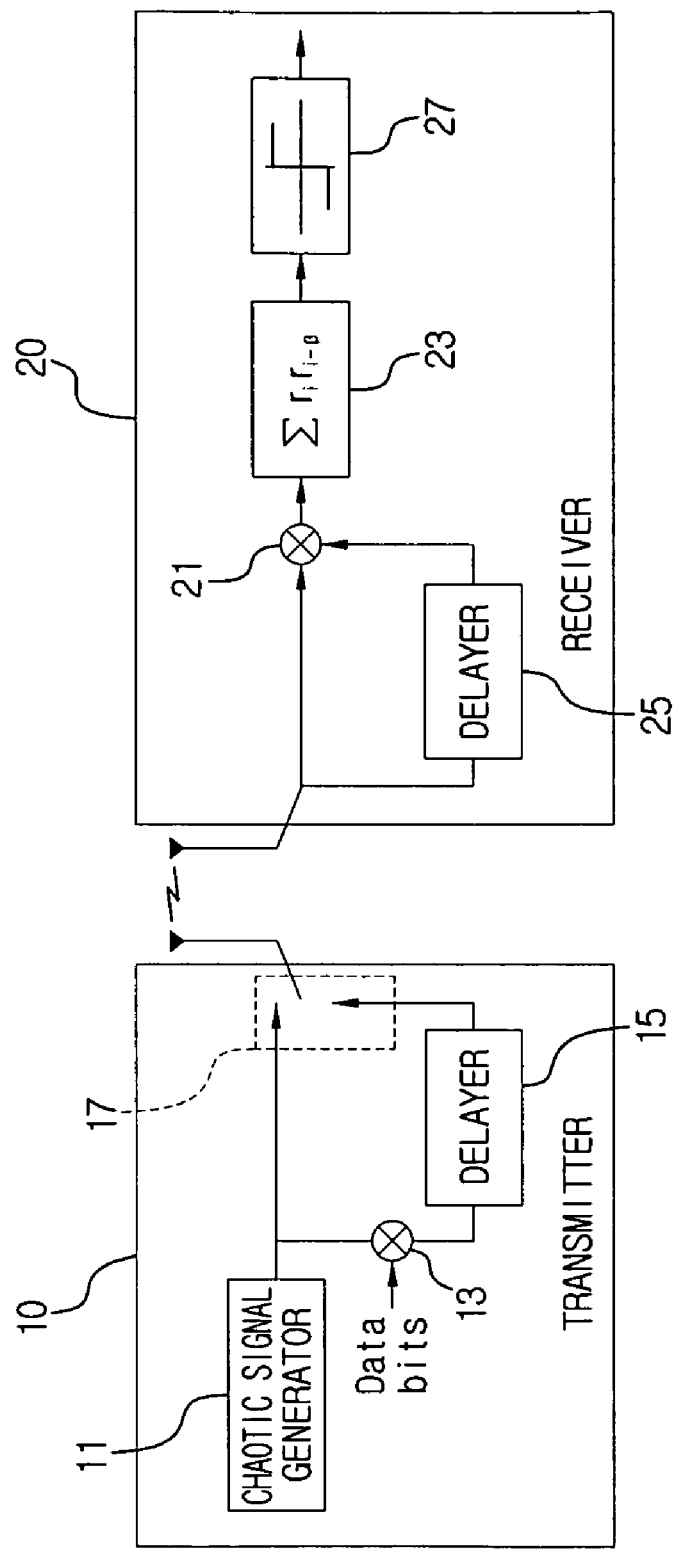
FIG. 1 is a block diagram of a DCSK communication system.
Figure 2:
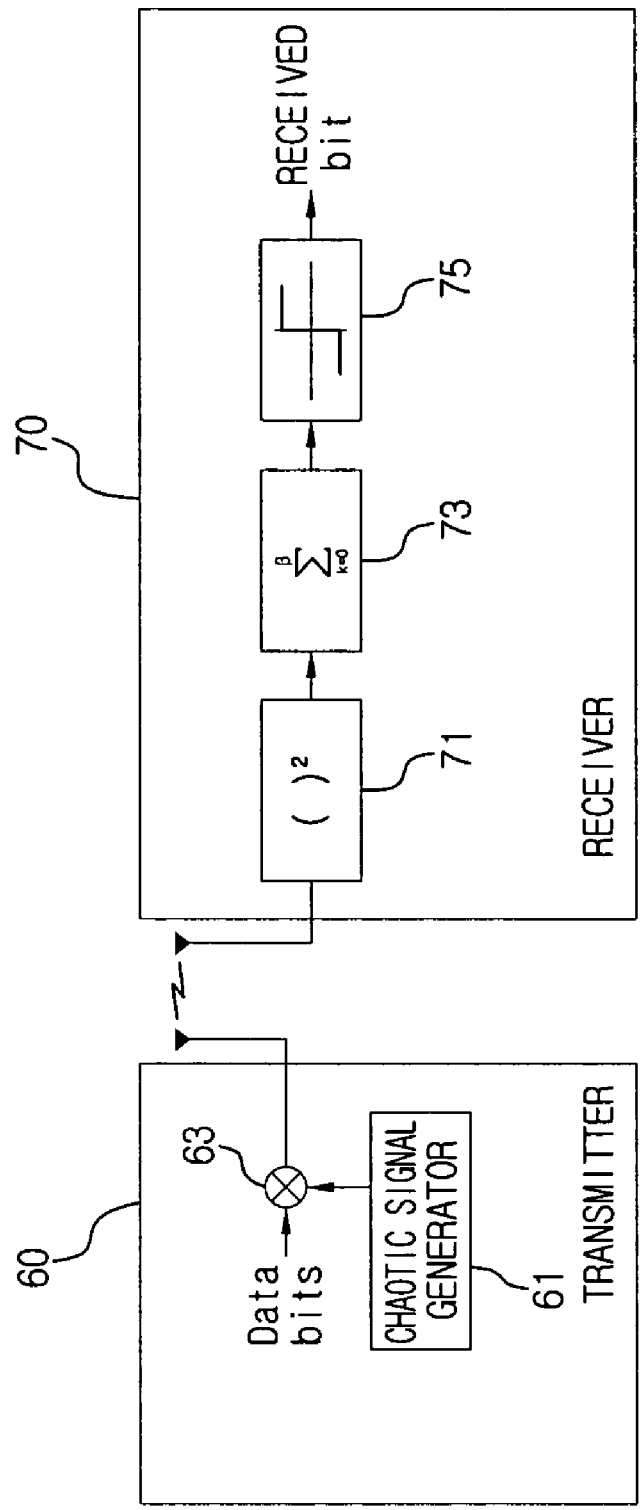
FIG. 2 is a block diagram of a COOK communication system.

Reference will now be made in detail to illustrative embodiments of the present invention, examples of which are illustrated in the accompanying drawings, wherein like reference numerals refer to the like elements throughout. The embodiments are described below to explain the present invention by referring to the figures.

Figure 3:
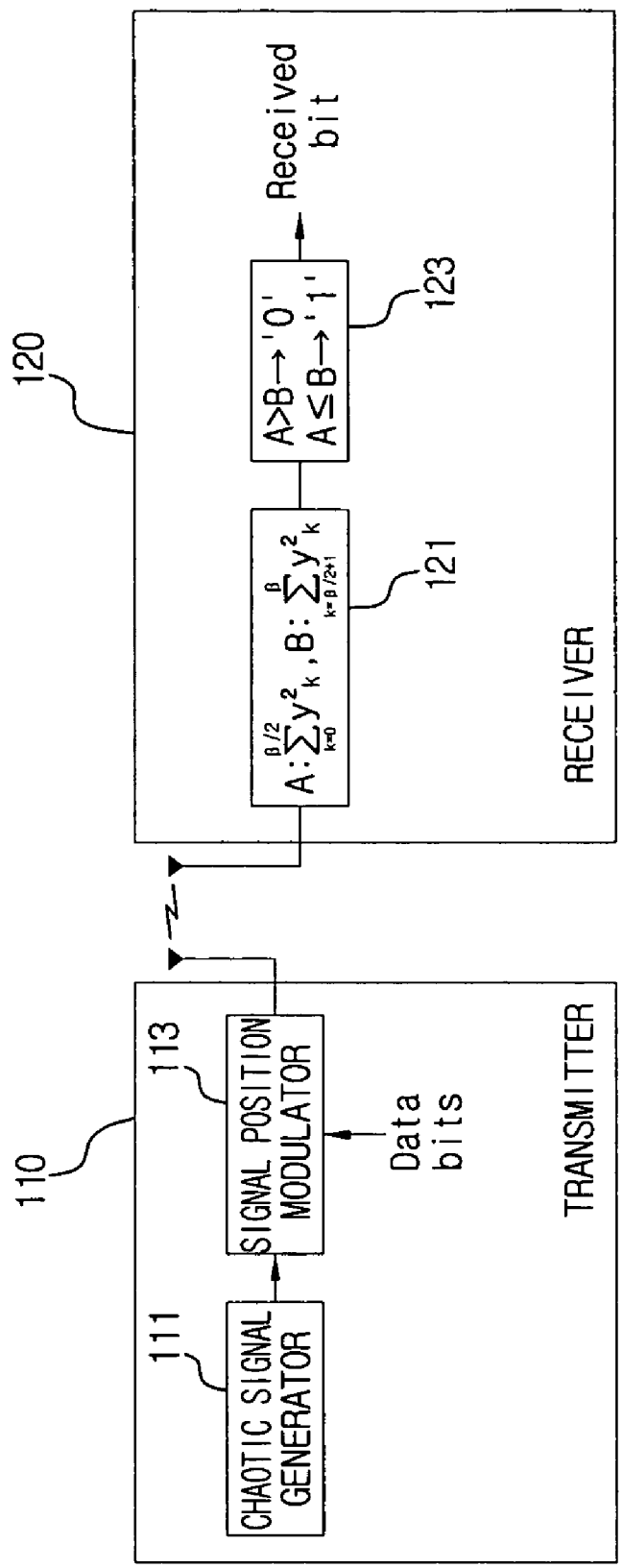
FIG. 3 is a block diagram of a pulse position based-chaotic modulation (PPB-CM) communication system according to an embodiment of the present invention.

FIG. 3 is a block diagram of a pulse position based-chaotic modulation (PPB-CM) communication system according to an embodiment of the present invention.

The PPB-CM communication system includes a transmitter 110 and a receiver 120.

The transmitter 110 includes a chaotic signal generator 111 and a signal position modulator 113.

The chaotic signal generator 111 generates a chaotic signal having characteristics to carry data. Generally, a chaos dynamic system is utilized. The chaotic signal generator 111 generates the chaotic signal directly in a frequency band for data transmission, from a preset radio frequency, microwave, infrared ray, visible ray, or ultraviolet ray.

The signal position modulator 113 splits one symbol period into a first half and a second half, inserts the chaotic signal received from the chaotic signal generator 111 in one of the first half and the second half, and provides the chaotic signal to an antenna. The signal position modulator 113 receives a data bit 0 or 1 to generate data, and inserts the chaotic signal in one of the first half and the second half according to whether the data bit is 0 or 1.

Figure 4A:
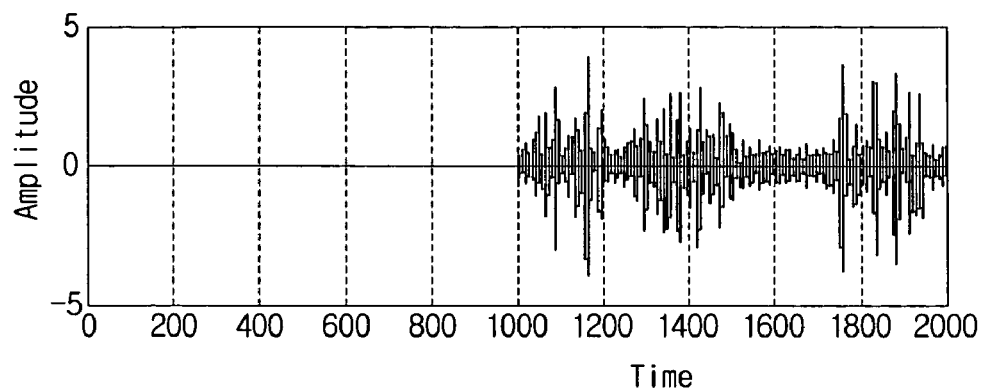
FIG. 4A is a graph showing a chaotic signal inserted into the second half of a symbol period.
Figure 4B:
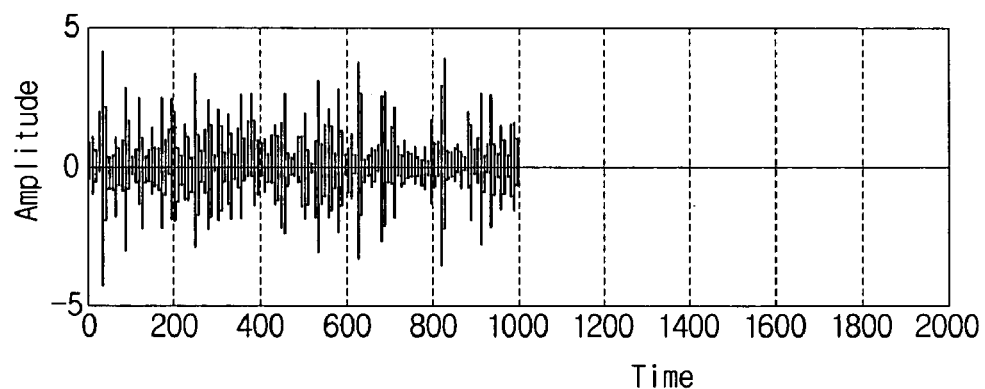
FIG. 4B is a graph showing a chaotic signal inserted to the first half of the symbol period.

For instance, the signal position modulator 113 inserts the chaotic signal in the second half of the symbol period as shown in FIG. 4A when the data bit 1 is input, and inserts the chaotic signal in the first half of the symbol period as shown in FIG. 4B when the data bit 0 is input.

Reversely, the signal position modulator 113 may insert the chaotic signal in the first half of the symbol period when the data bit 1 is input, and inserts the chaotic signal in the second half of the symbol period when the data bit 0 is input.

The receiver 120 includes a signal processor 121 and a data determiner 123.

The signal processor 121 calculates an energy value by adding the chaotic signals of the symbol period in the received communication signal. In doing so, the signal processor 121 adds the chaotic signals in the first half, and the chaotic signals in the second half in the symbol period, separately. Hence, the energy value is calculated with respect to the first half and the second half in the symbol period, separately.

The data determiner 123 determines whether the data bit is 0 or 1 by comparing the energy values with respect to the first half and the second half in the symbol period output from the signal processor 121. The data determiner 123 determines the data bit based on information relating to the positional relationship between the data bit determined at the signal position modulator 113, and the chaotic signal.

For instance, when the signal position modulator 113 has determined to insert the chaotic signal into the second half of the symbol period when the data bit is 1 and to insert the chaotic signal into the first half of the symbol period when the data bit is 0, the data determiner 123 determines the data bits as below.

The data determiner 123 determines the data bit as 0 when the energy value of the first half is greater than the energy value of the second half in the symbol period. That the energy value of the first half is greater than the energy value of the second half implies that the chaotic signal is inserted in the first half of the symbol period. This is because the signal position modulator 113 has inserted the chaotic signal in the first half of the symbol period when the data bit is 0. Likewise, the data determiner 123 determines the data bit as 1 when the energy value of the second half is greater than the energy value of the first half in the symbol period.

In the case where the signal position modulator 113 has determined to insert the chaotic signal into the second half of the symbol period when the data bit is 0 and to insert the chaotic signal into the first half of the symbol period when the data bit is 1, the data determiner 123 determines the data bits as below.

Preferably, after comparing the energy values of the first half and the energy value of the second half in the symbol period, the data determiner 123 determines the data bit as 1 when the energy value of the first half is greater than the energy value of the second half in the symbol period. When the energy value of the second half is greater, the data determiner 123 determines the data bit as 0.

In the embodiment of the present invention, when the energy value of the first half is equal to the energy value of the second half in the symbol period, the data determiner 123 determines the data bit as 1. When the energy value of the first half is equal to the energy value of the second half, the communication system may be set up to determine the data bit as 0 at the design phase.

Hereafter, descriptions are made on how to transmit and process the communication signal in the PPB-CM communication system as constructed above.

The chaotic signal generator 111 generates the chaotic signal, and the signal position modulator 113 splits the symbol period into the first half and the second half. Upon receiving the data bit, the signal position modulator 113 inserts the chaotic signal into either the first half or the second half according to whether the data bit is 0 or 1. As for the data bit 1, the chaotic signal is inserted into the second half of the symbol period. As for the data bit 0, the chaotic signal is inserted into the first half of the symbol period.

When the receiver 120 receives the communication signal, the signal processor 121 calculates the energy value by adding the chaotic signals in the first half and the chaotic signals the second half of the symbol period, separately. Next, the data determiner 123 determines the data bit of the symbol period by comparing the energy value of the first half with the energy value of the second half in the symbol period. When the energy value of the first half is greater than the energy value of the second half, the data determiner 123 determines the data bit as 0. When the energy value of the second half is equal to or greater than the energy value of the first half, the data bit 1 is determined.

Figure 5:
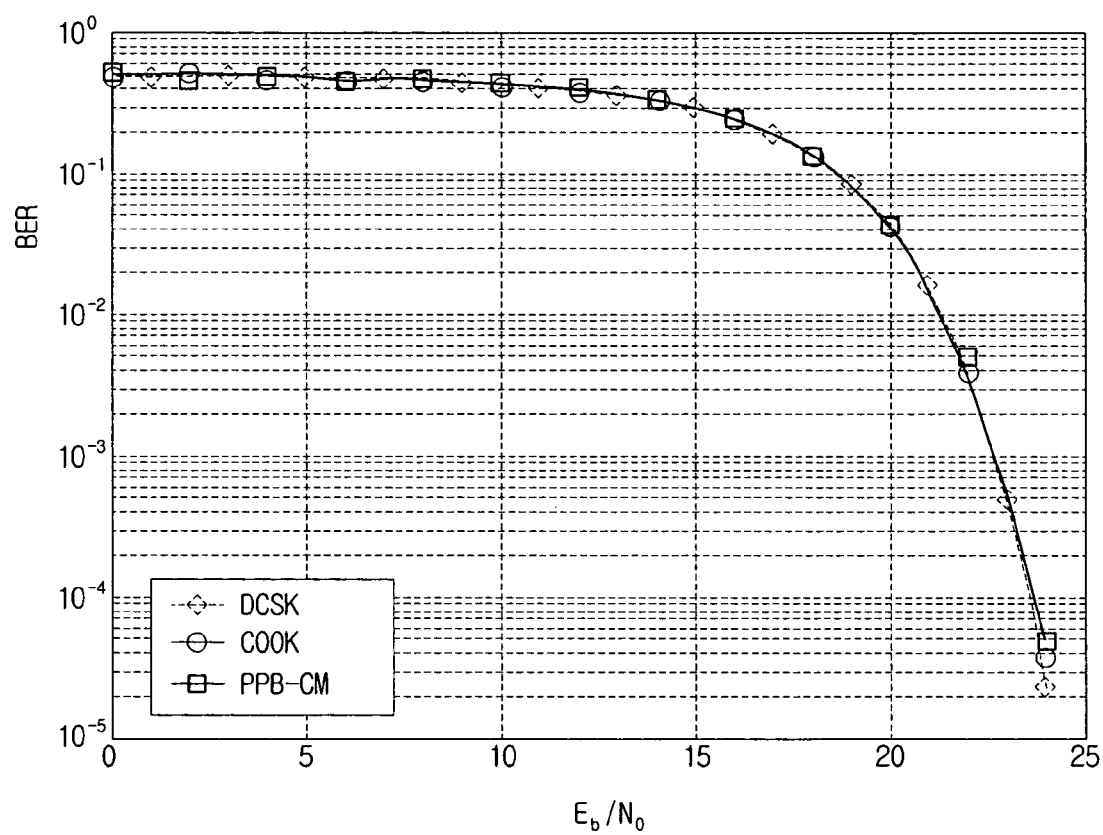
FIG. 5 is a graph showing the performance of the DCSK scheme, the COOK scheme, and the PPB-CM scheme using the simulation in the AWGN channel.

FIG. 5 is a graph showing the performance of the DCSK scheme, the COOK scheme, and the PPB-CM scheme using a simulation conducted in the AWGN channel. The data rate is 2.5 Mbps, and the sampling frequency is 16 GHz.

As shown in FIG. 5, the DCSK scheme, the COOK scheme, and the PPB-CM scheme form the same performance curve. It is concluded that the application of the PPB-CM scheme exhibits the same performance as the DCSK scheme and the COOK scheme.

Figure 6A:
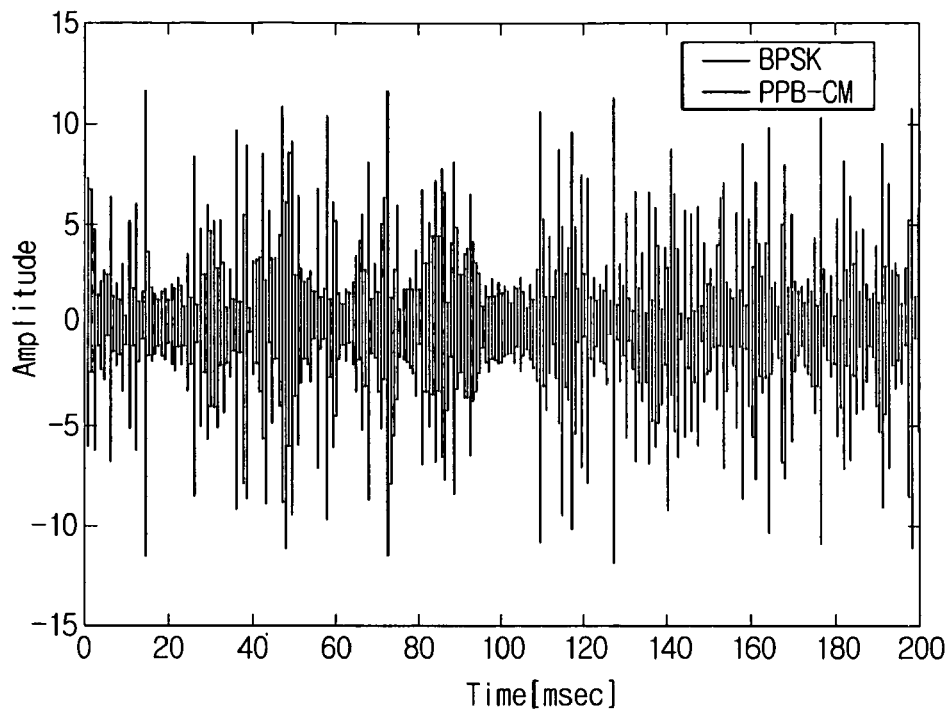
FIG. 6A is a graph comparing the symbol period between the PPB-CM scheme of the present invention and the conventional BPSK scheme.
Figure 6B:
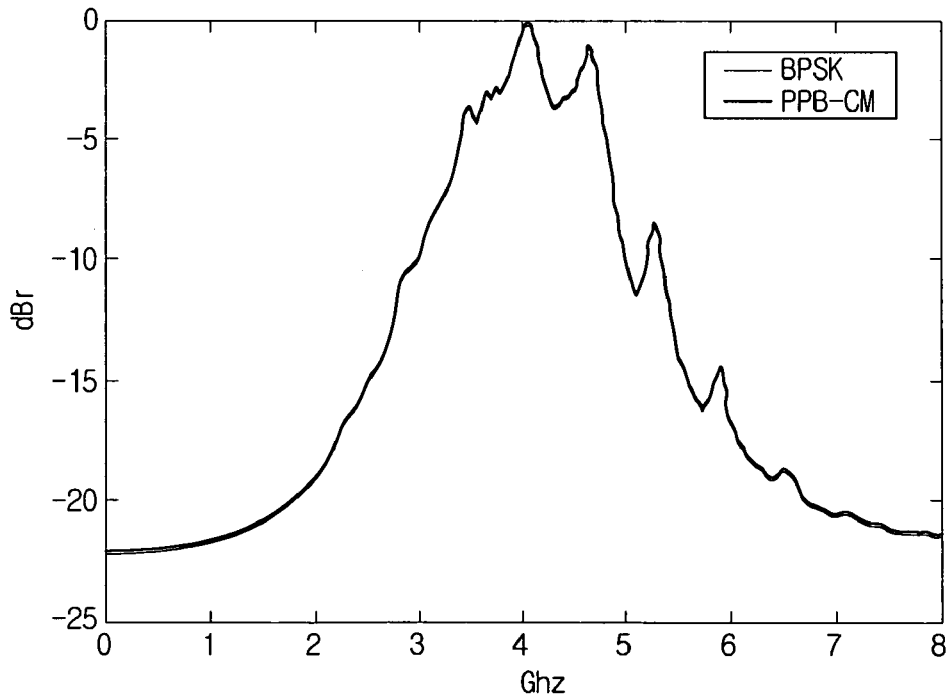
FIG. 6B is a graph comparing the bandwidth between the PPB-CM scheme of the present invention and the conventional BPSK scheme.

FIG. 6A is a graph comparing the symbol period between the PPB-CM scheme of the present invention and the conventional binary phase shift keying (BPSK) scheme, and FIG. 6B is a graph comparing the bandwidth between the PPB-CM scheme of the present invention and the conventional BPSK scheme.

As shown in FIG. 6A, the PPB-CM scheme has the reduced length of the chaotic signal in the symbol period in comparison with the conventional BPSK scheme. In practice, the symbol time for inserting the chaotic signal into the symbol period is reduced.

However, referring to FIG. 6B, the PPB-CM scheme has the same bandwidth as the conventional BPSK scheme. Therefore, the PPB-CM scheme enables the communications within the same bandwidth as the conventional schemes.

In the embodiment of the present invention, although the symbol period is split into only first and second halves to simplify the explanation, the symbol period can be split into a greater number of parts. For instance, the symbol period may be split into four parts. In this situation, the chaotic signal is inserted into the first and third parts as for the information bit 0, and into the second and fourth parts as for the information bit 1, or vice versa.

The receiver, receiving the communication signal, calculates the energy value of the respective parts in the symbol period, that is, calculates four energy values with respect to the symbol period. Next, the energy values of the first part and the second part are compared, and the energy values of the third part and the fourth part are compared. According to a result of the comparison, when the energy values of the first part and the third part are greater, the information bit 0 is determined. When the energy values of the second part and the fourth part are greater, the information bit 1 is determined.

Note that, to compare the energy values, the energy values of the first part and the third part are averaged, the energy values of the second part and the fourth part are averaged, and then the information bit is determined by comparing the averages.

As set forth above, the PPB-CM communication system splits the symbol period into the first half and the second half, inserts the chaotic signal into either the first half or the second half of the symbol period according to the data bit, and transmits the communication signal having the chaotic signal inserted. The receiver determines the data bit of the symbol period by comparing the energy values of the first half and the second half.

The PPB-CM communication system does not require a separate threshold to determine the data bit of the symbol period. Thus, the problem with determining the communication signal inaccurately because of the uncertain threshold as in the conventional COOK scheme is avoided. Furthermore, the communication system can be simply implemented without the delay line as is needed in the DCSK scheme.

Although embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A pulse position based-chaotic modulation (PPB-CM) communication system comprising:
    a transmitter which splits a symbol period, which is a transmission unit of a communication signal, into at least a pair of parts, inserts a data signal in one of the parts, and transmits a communication signal having the data signal inserted; and
    a receiver which receives the communication signal from the transmitter and determines bit information of the symbol period according to which part of the symbol period has the data signal inserted,
    wherein a signal position modulator in the transmitter inserts a chaotic signal into one of a first half and a second half of the symbol period when the bit information is 1 and inserts the chaotic signal into the other of the first half and the second half when the bit information is 0.

2. The PPB-CM communication system as in claim 1, wherein the transmitter further comprises:
    a chaotic signal generator which generates the chaotic signal which is used as the data signal; and
    the signal position modulator splits the symbol period into said parts, and inserts the chaotic signal generated at the chaotic signal generator into one of the parts according to the bit information.

3. The PPB-CM communication system as in claim 2, wherein the signal position modulator splits the symbol period into the first half and the second half to form a pair of said parts.

4. The PPB-CM communication system as in claim 3, wherein the signal position modulator inserts the chaotic signal into the second half when the bit information is 1, and inserts the chaotic signal into the first half when the bit information is 0.

5. The PPB-CM communication system as in claim 3, wherein the signal position modulator inserts the chaotic signal into the first half when the bit information is 1, and inserts the chaotic signal into the second half when the bit information is 0.

6. The PPB-CM communication system as in claim 3, wherein the receiver comprises:
    a signal processor which calculates an energy value by summing up the data signals in the symbol period; and
    a data determiner which determines the bit information using the energy value calculated at the signal processor.

7. The PPB-CM communication system as in claim 6, wherein the signal processor calculates the energy value for the respective parts in the symbol period.

8. The PPB-CM communication system as in claim 7, wherein the data determiner determines the bit information by comparing the energy values of the parts.

9. The PPB-CM communication system as in claim 8, wherein the signal processor calculates the energy value of the first half and the second half in the symbol period, respectively, and
    the data determiner determines the bit information according to which one of the energy values of the first half and the second half is greater.

10. The PPB-CM communication system as in claim 9, wherein, when the signal position modulator inserts the chaotic signal in the first half of the symbol period when the bit information is 0 and inserts the chaotic signal in the second half when the bit information is 1, the data determiner determines the bit information as 0 when the energy value of the first half is greater than the energy value of the second half and determines the bit information as 1 when the energy value of the second half is greater than the energy value of the first half.

11. The PPB-CM communication system as in claim 9, wherein, when the signal position modulator inserts the chaotic signal into the second half of the symbol period when the bit information is 0 and inserts the chaotic signal into the first half when the bit information is 1, the data determiner determines the bit information as 1 when the energy value of the first half is greater than the energy value of the second half and determines the bit information as 0 when the energy value of the second half is greater than the energy value of the first half.

12. A PPB-CM communication system comprising:
    a transmitter including
    a chaotic signal generator which generates a chaotic signal; and
    a signal position modulator which splits a symbol period into a plurality of parts and inserts the chaotic signal generated at the chaotic signal generator into one of the plurality of parts wherein the signal position modulator inserts a chaotic signal into at least one of a plurality of parts when the pit information is 1 and inserts the chaotic signal into the other of the plurality of parts when the bit information is 0.

13. The PPB-CM communication system as in claim 12, comprising:
a receiver including
a signal processor which calculates an energy value by summing up signals in the symbol period; and
a data determiner for determining bit information of the symbol period by use of the energy value calculated at the signal processor.

14. A PPB-CM communication method comprising:
generating, by a transmitter, a data signal;
splitting a symbol period, which is a transmission unit of a communication signal, into at least a pair of parts; and
inserting the data signal into one of the parts and transmitting the communication signal having the data signal inserted,
wherein the transmitter inserts a chaotic signal into one of a first half and a second half of the symbol period when bit information is 1 and inserts the chaotic signal into the other of the first half and the second half when the bit information is 0.

15. The PPB-CM communication method as in claim 14, wherein the generating of the data signal is the generating of the chaotic signal.

16. The PPB-CM communication method as in claim 14, wherein the symbol period is split into the first half and the second half.

17. The PPB-CM communication method as in claim 16, wherein the inserting of the data signal inserts the chaotic signal into the second half when the bit information is 1, and inserts the chaotic signal into the first half when the bit information is 0.

18. The PPB-CM communication method as in claim 16, wherein the inserting of the data signal inserts the chaotic signal into the first half when the bit information is 1, and inserts the chaotic signal into the second half when the bit information is 0.

19. The PPB-CM communication method as in claim 14, comprising:
receiving the communication signal:
detecting into which part of the symbol period the data signal is inserted; and
determining the bit information of the symbol period according to the detected position of the data signal.

20. The PPB-CM communication method as in claim 19, wherein the detecting of the data signal calculates an energy value by summing up the signals in the parts of the symbol period, respectively.

21. The PPB-CM communication method as in claim 20, wherein the detecting of the data signal calculates an energy value with respect to the first half and the second half, respectively, of the symbol period.

22. The PPB-CM communication method as in claim 21, wherein the detecting of the data signal compares the energy values of the first half and the second half.

23. The PPB-CM communication method as in claim 22, wherein the data information is determined according to which one of the energy values in the first half and the second half is greater.

24. The PPB-CM communication method as in claim 23, wherein the determining of the bit information comprises:
when a transmitter inserts the chaotic signal into the first half of the symbol period when the bit information is 0 and inserts the chaotic signal into the second half when the bit information is 1, determining the bit information as 0 when the energy value of the first half is greater than the energy value of the second half and determining the bit information as 1 when the energy value of the second half is greater than the energy value of the first half.

25. The PPB-CM communication method as in claim 23, wherein the determining of the bit information comprises:
when a transmitter inserts the chaotic signal into the second half of the symbol period when the bit information is 0 and inserts the chaotic signal into the first half when the bit information is 1, determining the bit information as 1 when the energy value of the first half is greater than the energy value of the second half and determining the bit information as 0 when the energy value of the second half is greater than the energy value of the first half.

26. A PPB-CM communication method comprising:
generating a data signal;
splitting a symbol period, which is a transmission unit of a communication signal, into at least a pair of parts;
inserting the data signal into one of the parts and transmitting the communication signal having the data signal inserted;
receiving the communication signal at a receiver;
determining into which one of the parts of the symbol period the data signal is inserted; and
determining bit information of the symbol period according to the detected position of the data signal,
wherein a chaotic signal is inserted into one of a first half and a second half of the symbol period when the bit information is 1 and the chaotic signal is inserted into the other of the first half and the second half when the bit information is 0.

* * * * *